(12) United States Patent
Beavers

(10) Patent No.: US 6,373,944 B1
(45) Date of Patent: Apr. 16, 2002

(54) MULTIPLE TELEPHONE OUTLET BOX WITH SURGE PROTECTION

(75) Inventor: Roger L. Beavers, Brown Summit, NC (US)

(73) Assignee: Abacon Telecommunications, LLC, Greensboro, NC (US)

(*) Notice: Subject to any disclaimer, the term of this patent is extended or adjusted under 35 U.S.C. 154(b) by 0 days.

(21) Appl. No.: 09/405,493

(22) Filed: Sep. 24, 1999

Related U.S. Application Data

(63) Continuation-in-part of application No. 09/260,475, filed on Mar. 1, 1999.

(51) Int. Cl.$^7$ .......................... H04M 1/00; H01R 13/60

(52) U.S. Cl. ....................... 379/438; 439/536

(58) Field of Search ................. 379/438; 439/638, 439/536, 356, 362, 364

(56) References Cited

U.S. PATENT DOCUMENTS

| | | | |
|---|---|---|---|
| 4,061,411 A | 12/1977 | Gumb et al. | 339/159 |
| 4,241,974 A | 12/1980 | Hardesty | 339/154 |
| 4,362,905 A | 12/1982 | Ismail | 179/1 |
| 4,865,561 A | 9/1989 | Collier et al. | 439/391 |
| 4,944,698 A | 7/1990 | Siemon et al. | 439/676 |
| 5,178,554 A | 1/1993 | Siemon et al. | 439/188 |
| 5,425,172 A | 6/1995 | Carswell et al. | 29/884 |
| 5,444,451 A | 8/1995 | Johnson et al. | 342/453 |
| 5,539,821 A * | 7/1996 | Blonder | 379/446 |
| 5,651,690 A | 7/1997 | Klas et al. | 439/352 |
| 5,666,408 A | 9/1997 | Lao | 379/442 |
| 5,697,815 A | 12/1997 | Drewnicki | 439/638 |

OTHER PUBLICATIONS

Shiunn Yang Enterprise Co., Ltd.; information from the Internet; date unknown.
Photographs of Suttle Apparatus Corp. SE–625D; date unknown.
Molex Modular Plug–FCC 68 Short Body,90075 information from the Internet; date unknown.
Telephone Plugs–Analog Plain Old Telephone Service (POTS); information from Internet; date unknown.
Tii Industries, Inc.; Lightning Facts; information from the Internet; date unknown.
Citel, Inc.—The Need for Sugre Protection; information from the Internet; date unknown.
Ahern Business Communication Experst; information from the Internet; date unknown.
The Siemon Company–Modular Jack Styles; information from the Internet; date unknown.

(List continued on next page.)

Primary Examiner—Jack Chiang
(74) Attorney, Agent, or Firm—MacCord Mason PLLC

(57) ABSTRACT

An apparatus provides multiple telephone jacks for RJ11 and RJ45 connectors at an outlet box that has an installed telephone jack and holes to receive cover plate support screws. The apparatus includes a housing and a wiring board in the housing. The housing has an outlet box side and another side and generally has the shape of a rectangular parallelopiped with a minimal distance from the outlet box side to the other side to provide the appearance of a conventional outlet box coverplate with minimal protrusion into a room from the outlet box when installed. A telephone cord having a RJ11 or RJ45 plug connected to both ends of the telephone cord extends from the housing on the outlet box side to connect the installed phone jack to the multiple telephone jack apparatus. Further, surge protection circuitry, including an overcurrent protection device and a overvoltage protection device, is mounted on the wiring board to provide automatically resetting surge protection for the apparatus.

32 Claims, 6 Drawing Sheets

OTHER PUBLICATIONS

Avinfo–RJ45 and Category–5 Cable; information from the Internet; date unknown.
Molex–Modular Plugs and Jacks Connector FCC(87031); information from the Internet; date unknown.
CCSO–Pin Assignments for Commonly Used Cables; information from the Internet; date unknown.
Molex–Modular Plugs and Jacks Connector FCC(95043); information from the Internet; date unknown.
Raychem literature entitled PolySwitch TS600 Overcurrent Protection Devices; date unknown.
Raychem literature entitled SiBar Thyristor Surge Protectors; copyright 1999.

* cited by examiner

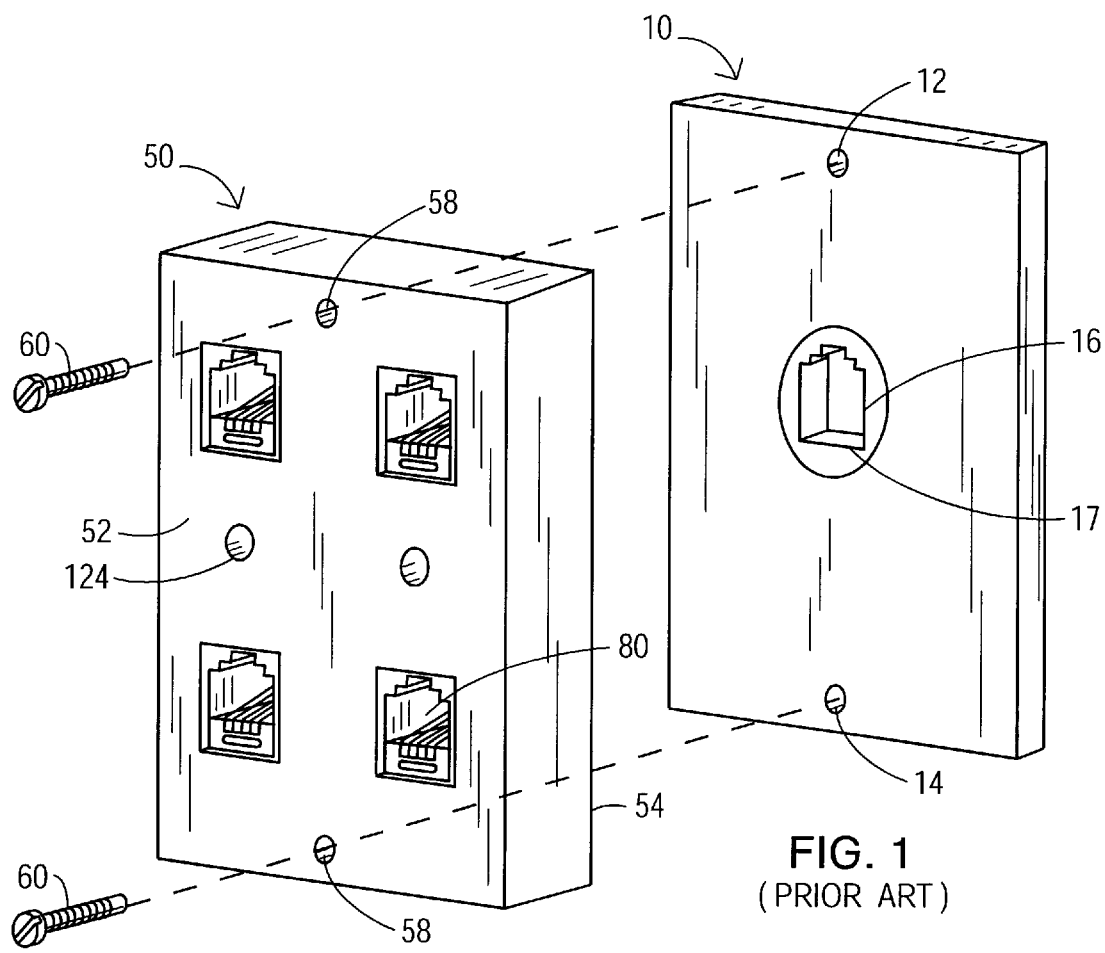

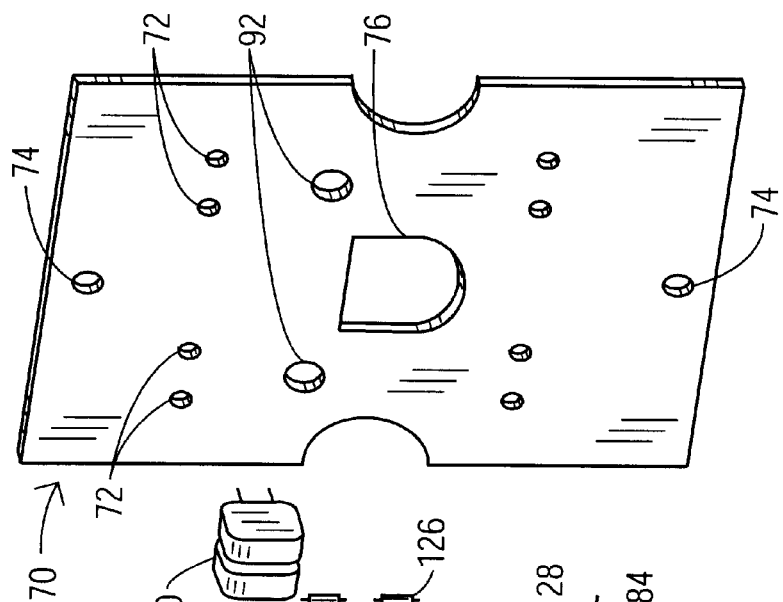
FIG. 3A
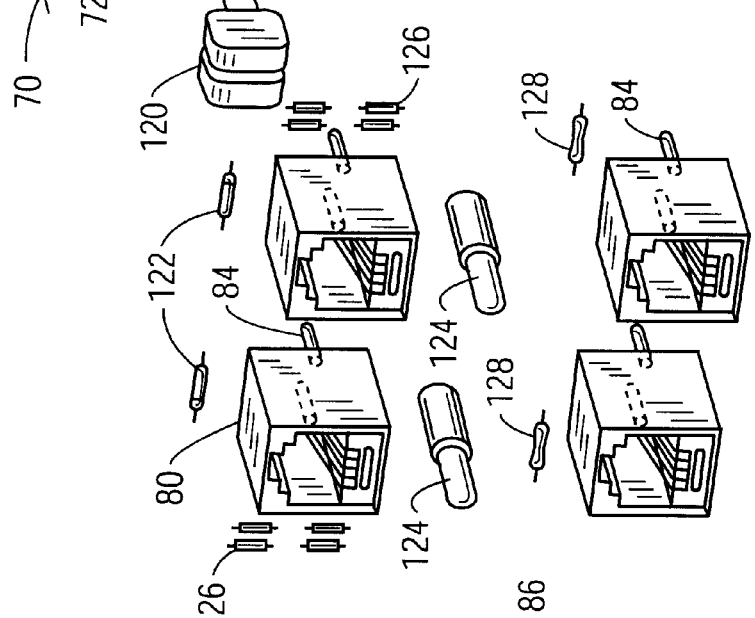
FIG. 3B
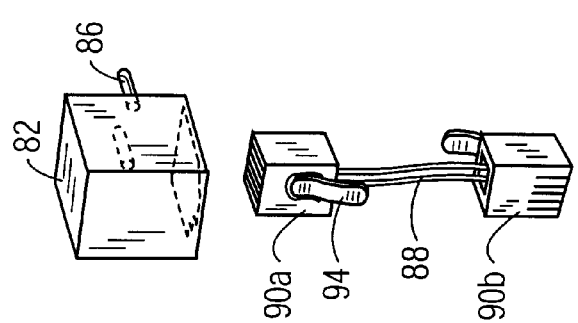
FIG. 3C
FIG. 3

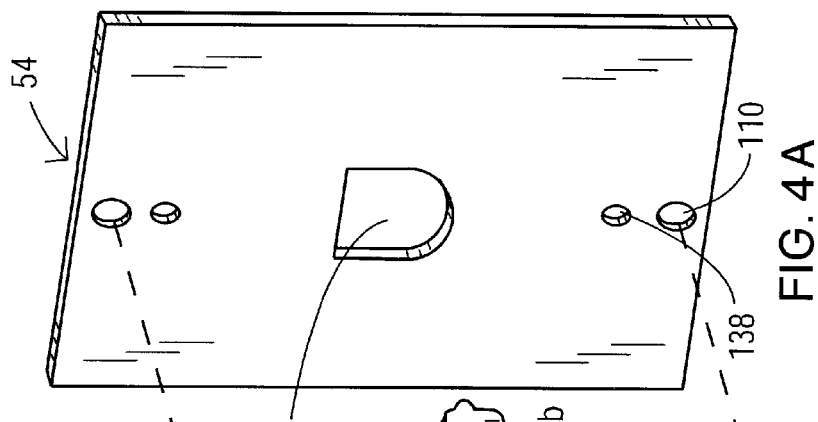
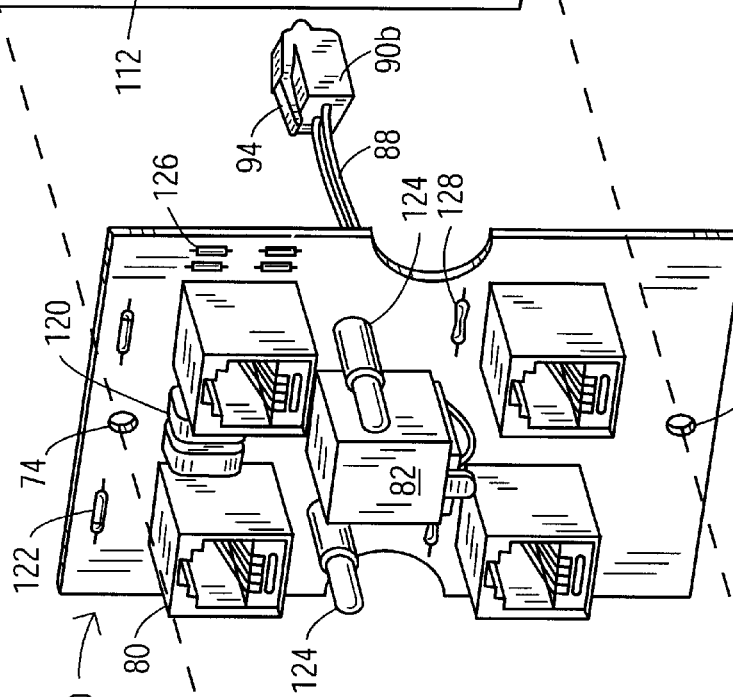
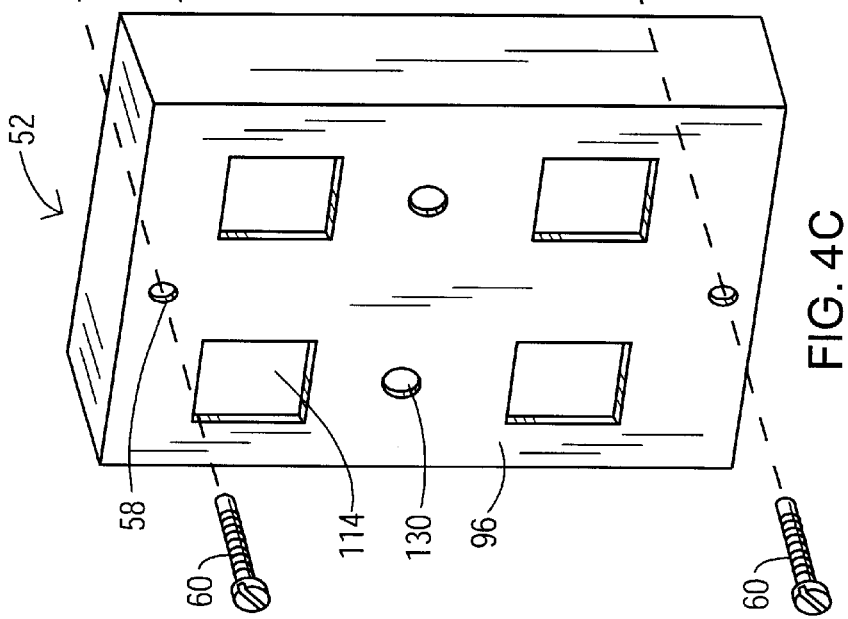
FIG. 4A
FIG. 4B
FIG. 4C
FIG. 4

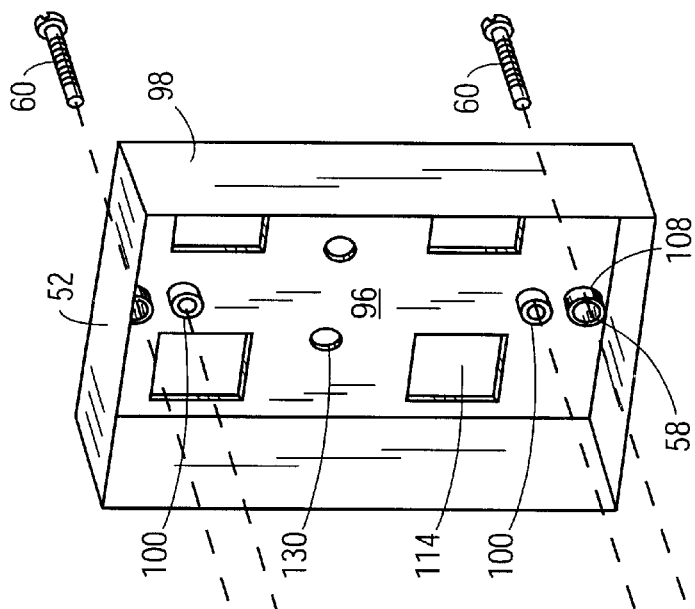
FIG. 5A
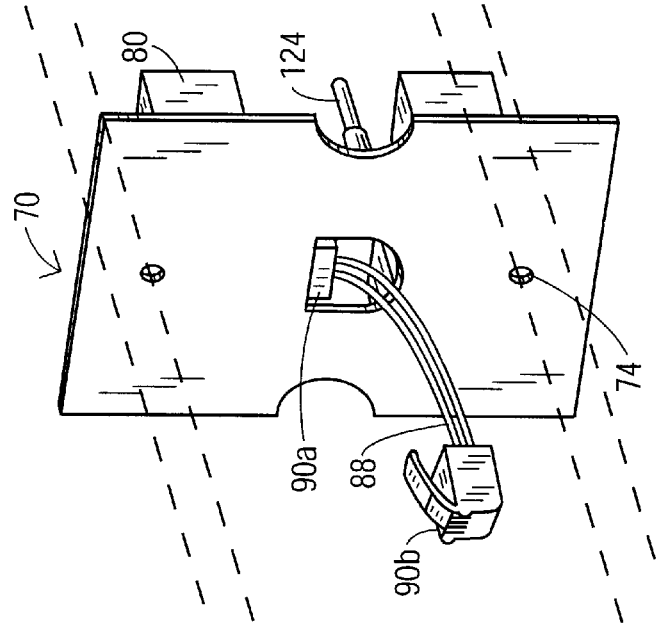
FIG. 5B
FIG. 5
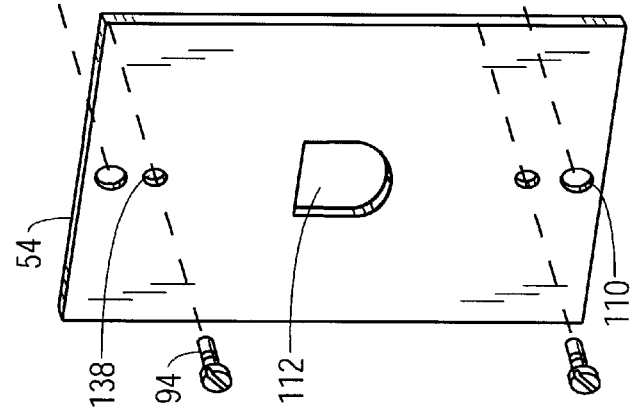
FIG. 5C

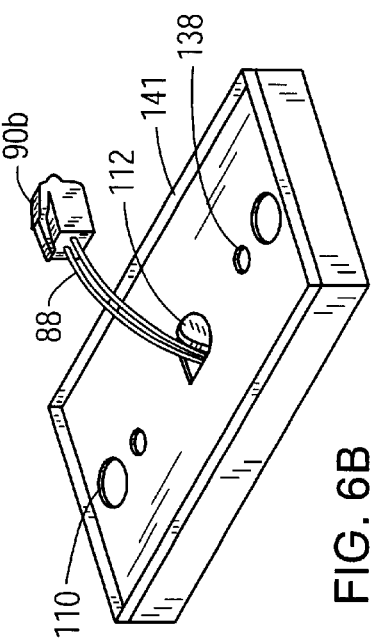
FIG. 6B
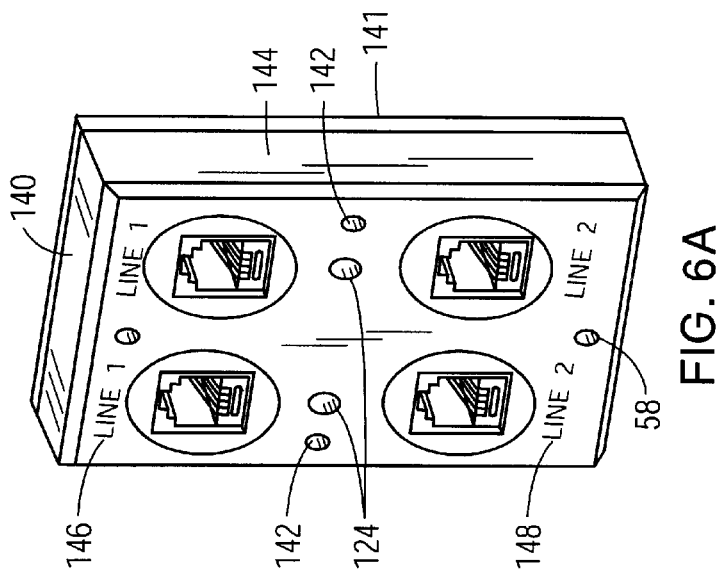
FIG. 6A
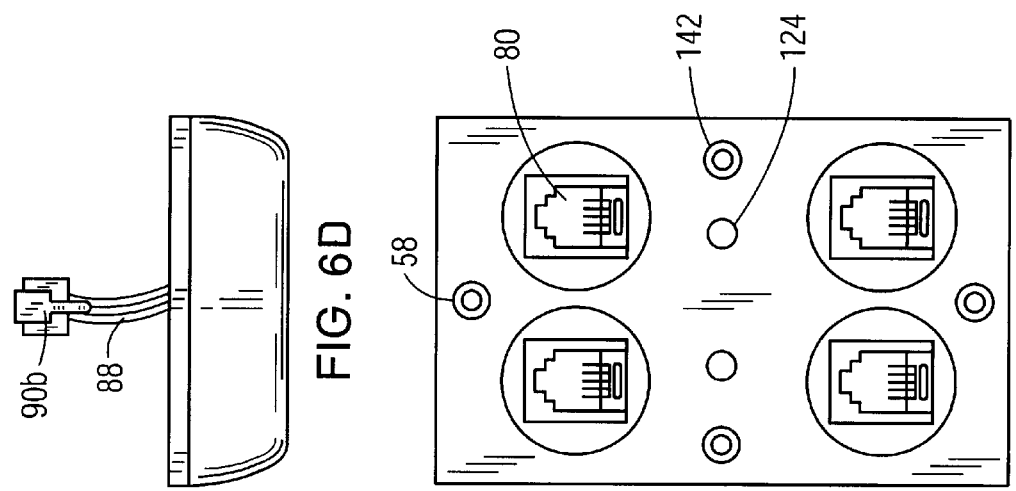
FIG. 6D
FIG. 6C
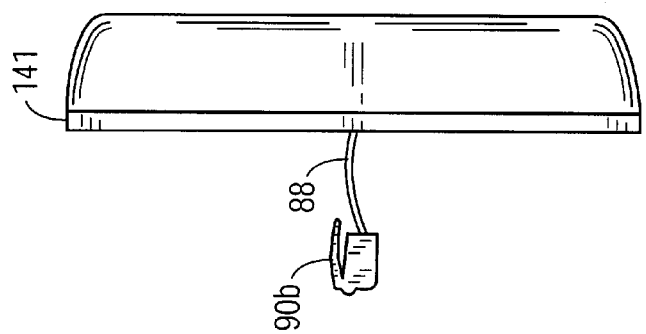
FIG. 6E

MULTIPLE TELEPHONE OUTLET BOX WITH SURGE PROTECTION

This is a continuation-in-part of Application No. 09/260,475, filed Mar. 1, 1999.

BACKGROUND OF THE INVENTION

The present invention relates to improvements in wiring devices for telecommunications. In particular, the present invention provides a replacement for conventional faceplates or coverplates that are installed on telephone jack housings, in order to provide multiple jacks from a single, installed jack. The present invention further provides electrical surge protection for the multiple telephone jacks, which is preferably automatically resetting.

Standard modular telephone jacks, such as the RJ11 and RJ45 connector jacks, have been around for decades, and many telephone installations have been made using these connectors. Thus, there is a large installed base of telephone outlets in residences and businesses, and other installations for telephones, fax machines, and the like using such connectors.

In recent years, the number of telephone lines needed for typical daily operations has proliferated. In addition to the additional voice lines, lines for Internet connection, fax connection, and the like have become more and more desirable for both residential and business installations. The installed single outlet RJ11 and RJ45 connectors are not sufficient for these new needs. Various efforts have been made to address the need by providing after-market connectors enabling multiple telephone lines to be connected to a single outlet. Examples are shown in U.S. Pat. No. 5,697,815 to Drewnicki; U.S. Pat. No. 5,666,408 to Lao; U.S. Pat. No. 5,651,690 to Klas et al.; U.S. Pat. No. 5,425,172 to Carswell et al.; U.S. Pat. No. 4,865,561 to Collier et al.; U.S. Pat. No. 4,362,905 to Ismail; U.S. Pat. No. 4,241,974 to Hardesty; and U.S. Pat. No. 4,061,411 to Gumb et al.

While these connectors do provide for multiplication of outlets, they have the drawback of protruding into a room by a considerable amount, causing numerous problems. First, the protruding device is unsightly. Second, if a piece of furniture is to be located near the wall, the protruding portion requires the furniture to be kept a substantial distance away from the wall. Third, the protruding item, supported typically generally only by the intermitting of a male plug with a female jack, is subject to damage by a collision between something moving in the room and the protruding connector. Of course, the excessive protrusion makes such collisions more likely and it also enhances the leverage on the jack when the collision occurs, making damage more likely.

Additional efforts have been made to provide multiple outlets including commercial products such as a jack Model SC-625D of Suttle Apparatus Corporation. However, such products have the drawback of being complicated and requiring rewiring of the outlet in order to be installed. A homeowner or non-technical person may be reluctant to undertake such a rewiring, and is subject to making an error or damaging the apparatus in making an attempt.

Further, as telecommunications devices have become more technologically advanced, they have become more vulnerable to voltage surges and transients. The small size and high sensitivity of chips used in IC packages makes them prone to faster degradation and considerably lowers their failure threshold. Thus, the consequence of an electrical surge may be severe, causing such problems as loss of memory, problems retrieving data, altering data, etc. The most common source of an electrical surge is a nearby lightning strike. A single lightning bolt may contain over one hundred million volts of electricity and may produce as many as 30 electrical surges. Therefore, unless telecommunications devices are adequately protected, they may be subject to severe damage from a voltage surge.

Accordingly, there is a need in the art for an easy to install multiplier for telephone jacks that does not require special expertise, is securely mounted to the wall, and does not protrude excessively into a room. Further, there is a need in the art to protect multiple outlet telephone jacks from voltage surges and transients.

SUMMARY OF THE INVENTION

The present invention fulfills this need in the art by providing an apparatus for providing multiple telephone jacks at an outlet box that has an installed telephone jack and holes to receive cover plate support screws, including a wiring board having mounted thereon an input telephone jack, a plurality of output telephone jacks, a plurality of wires from the input telephone jack to the plurality of output telephone jacks so that circuits are formed from the input jack to the output jacks, and a plurality of electrical components for providing surge protection circuitry. The surge protection circuitry is preferably resettable, and more preferably, automatically resettable. A housing for the wiring board has an outlet box side and another side, with the wiring board arranged within the housing so that the number of telecommunications paths available from the outlet box side of the housing to the other side of the housing is multiplied. The housing has holes arranged to receive mounting screws to pass through the housing for engagement with the holes in the outlet box to form a secure mount of the housing on the outlet box.

Preferably, a telephone cord having a modular telephone plug, such as an RJ11 or RJ45 connector, on each end of the cord is provided to enable connection of the wiring board with the installed jack on the outlet box. The plug on one end of the telephone cord is inserted into the input jack on the wiring board. The telephone cord then extends out of the rear of the wiring board and the housing through openings which provide an access path for the cord, and the plug on the other end of the telephone cord is inserted into the installed jack of the outlet box. Each modular telephone plug includes a release lever for easy insertion into the telephone jacks.

In a preferred embodiment the housing includes a top having a coverplate and sidewalls and a bottom, and the wiring board is secured between the top and the bottom so that the top, bottom, and sidewalls substantially surround all sides of the wiring board. Also in a preferred embodiment, the bottom, wiring board, and top are secured to one another with fasteners passing through the bottom and the wiring board, and lodging in the coverplate so that the top, bottom and sidewalls substantially surround all sides of the wiring board. In this embodiment the coverplate preferably has an outlet box side and standoffs on its outlet box side positioned to hold the wiring board spaced away from a main portion of the top. The coverplate may also have bosses on its outlet box side surrounding the mounting holes to hold the bottom spaced away from the coverplate and away from the wiring board.

In a preferred embodiment the housing generally has the shape of a rectangular parallelopiped with a minimal distance from the outlet box side to the other side, to provide the appearance of a conventional outlet box coverplate with minimal protrusion into a room from the outlet box when installed.

The plurality of output telephone jacks may be four output telephone jacks. The wires from the input jack to the output jacks may connect all connected output jacks to the same telecommunications path. Alternatively, the wires from the input jack to the output jacks may connect one of the connected output jacks to a different telecommunications path than another output jack.

In a preferred embodiment, the wiring board includes surge protection circuitry. The surge protection circuitry may include at least one overcurrent protection device and at least one overvolatge protection device to protect the apparatus from abnormally high currents and voltages, respectively. Further, the surge protection circuitry may include at least one light emitting diode indicating that the surge protection circuitry is properly functioning. Preferably, the surge protection circuitry automatically resets when a surge condition is removed, allowing normal operations to continue.

The invention also provides a method of assembly of a telephone jack multiplier for an outlet box including affixing a plurality of output telephone jacks and an input telephone jack to a wiring board, connecting wires from the inputjack to the plurality of output telephone jacks so that circuits are formed from the input jack to the output jacks, installing the wiring board in a housing having an outlet box side and another side to form a plurality of telecommunication paths from the outlet box side of the housing to the other side of the housing, and providing mounting screws for the housing to pass through holes in the housing for engagement with the holes in the outlet box to form a secure mount of the housing on the outlet box.

The act of installing may include affixing the wiring board between a bottom and a top that has a coverplate and sidewalls so that the top, bottom and sidewalls substantially surround all sides of the wiring board.

The act of installing may include inserting a first telephone plug on a first end of a telephone cord with the input telephone jack and extending another end of the telephone cord out of the outlet box side of the housing through an access path created by opening in the wiring board and an opening in the outlet box side of the housing.

Installing may also include securing the wiring board between a bottom and a coverplate of the housing by passing fasteners through the bottom of the housing and the wiring board, and lodging the fasteners in the coverplate.

The act of wiring the input jack to the output jacks may include connecting all connected output jacks to the same telecommunications path. Alternatively it may include connecting one of the connected output jacks to a different telecommunications path than another output jack.

The invention also provides a method of installation of a multiple telephone jack apparatus on an outlet box in a surface including removing a coverplate from the outlet box to expose an opening in the surface and an installed jack and mounting holes on the outlet box, positioning a multiple telephone jack apparatus on the opening in the surface while inserting a plug on a telephone cord that extends from the apparatus into the installed jack, and passing screws through the multiple telephone jack apparatus and into the mounting holes on the outlet box to secure the multiple telephone jack apparatus onto the outlet box.

The invention further provides a method of removal of a multiple telephone jack apparatus from an outlet box in a surface including unscrewing screws that pass through the multiple telephone jack apparatus and into the mounting holes on the outlet box to loosen the multiple telephone jack apparatus from the outlet box, releasing a lever on a plug on a telephone cord extending from the multiple telephone jack apparatus into a jack in the outlet box to release the plug from the jack in the outlet box, and moving the multiple telephone jack apparatus away from the outlet box.

The invention further provides a method of installation of a multiple telephone jack apparatus on an outlet box in a surface including removing screws; holding a coverplate to the outlet box that has a single installed jack to expose screw mounting holes in the coverplate on the outlet box; positioning a multiple telephone jack apparatus on the coverplate while inserting a plug on a telephone cord that extends from the apparatus into the installed jack; and passing long screws through the multiple telephone jack apparatus and into the mounting holes on the outlet box to secure the multiple telephone jack apparatus onto the outlet box.

BRIEF DESCRIPTION OF THE DRAWINGS

The invention will be better understood by a reading of the Detailed Description of the Preferred Embodiments along with a review of the drawings, in which:

FIG. 1 is a perspective view of a prior art coverplate for a telephone jack mounted in an outlet box;

FIG. 2 is a perspective view of a preferred embodiment of a multiple outlet telephone jack according to the invention;

FIGS. 3A–3C are perspective views of the components to be assembled together to make a wiring board assembly according to the embodiment of FIG. 2;

FIG. 4A–4C are front perspective views of the components to be assembled together to make a multiple outlet telephone jack according to the embodiment of FIG. 2;

FIG. 5A–5C are rear perspective views of the components to be assembled together to make a multiple outlet telephone jack according to the embodiment of FIG. 2; and FIG. 6A is a front perspective view of an alternative embodiment for a top showing three optional refinements.

FIG. 6B is a rear perspective view of the embodiment of FIG. 6A;

FIG. 6C is a front view of another embodiment;

FIG. 6D is a top view of the embodiment of FIG. 6C; and

FIG. 6E is a side view of the embodiment of FIG. 6C.

DETAILED DESCRIPTION OF THE PREFERRED EMBODIMENT

Figure 3D:
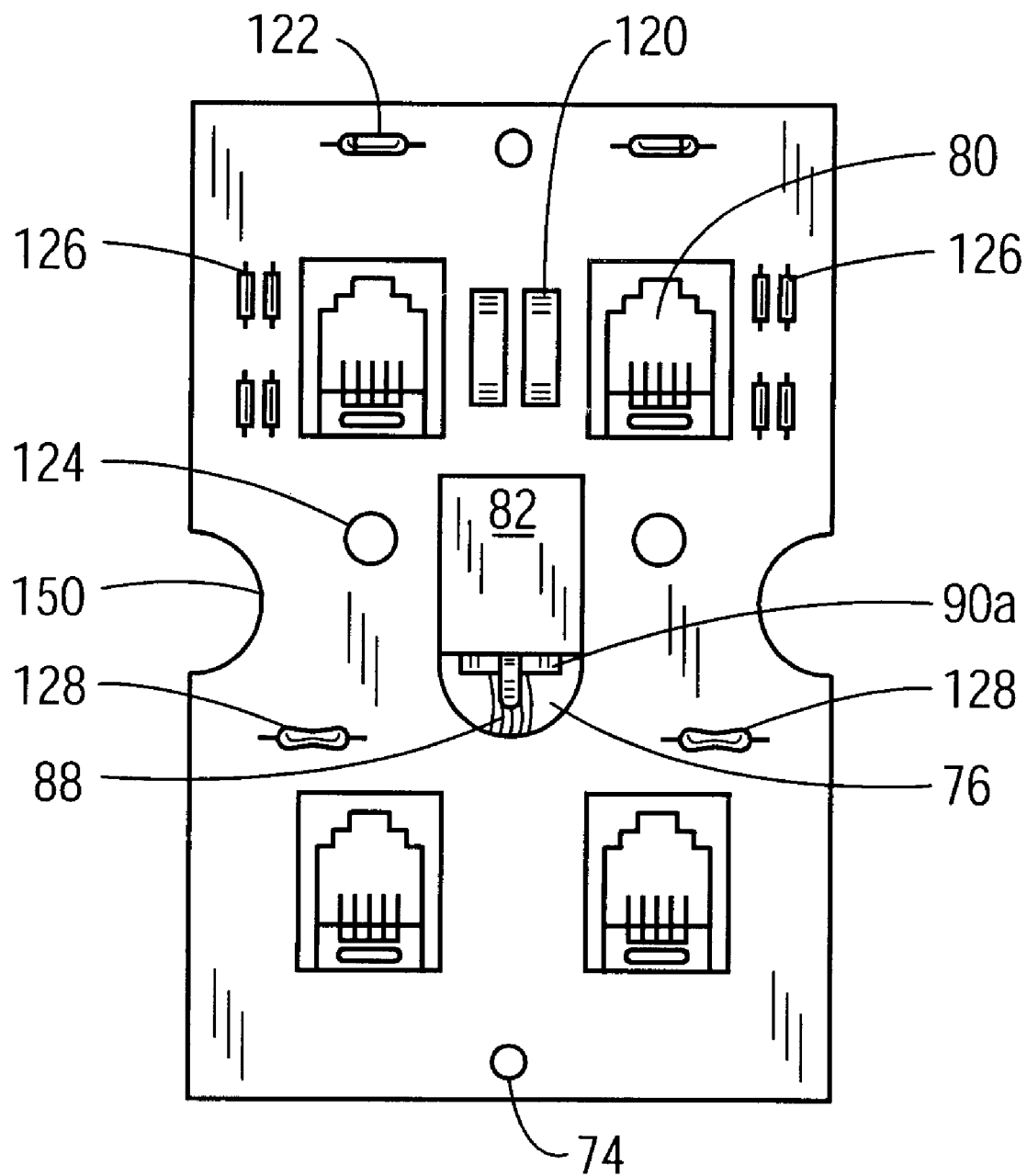
FIG. 3D is a front view of an assembled wiring board according to an embodiment of FIG. 2.

As seen in FIG. 1, a conventional coverplate 10 for wall mounted telephone jacks has upper and lower holes 12 and 14 into which screws fit to be received by mating holes on an outlet box (not shown). These screws hold the plate 10 in place. A hole 16 in the middle of the plate 10 allows a telephone jack 17 mounted in the outlet box to be accessed for insertion and removal of telephone jacks such as RJ11 and RJ45 plugs.

As seen in FIG. 2, the preferred embodiment of the present invention provides a multiple outlet telephone jack apparatus 50 having a housing made up of a top 52 and a bottom 54. The housing has upper and lower holes 58 adapted to allow screws 60 to pass through the entire apparatus 50 for engagement with the mounting holes in the installed outlet box. In the embodiment depicted in FIG. 2, the conventional coverplate 10 is removed from the outlet and the apparatus 50 is installed in its place. So installed, the multiple outlet telephone jack apparatus 50 has four independently accessible output telephone jacks 80 available to receive various plugs, as desired.

FIGS. 5A–5C show the apparatus 50 in an exploded, rear perspective view with the top 52 separated from the bottom 54, showing the normally internally located wiring board 70.

The wiring board 70, as seen in FIG. 3A, may be formed of a stamped metal or other suitable material. It has four sets of peripheral holes 72 arranged about a central window 76. The peripheral holes 72 are sized to receive prongs 84 from output jacks 80, as seen in FIG. 3B. Just above the central window 76 of the wiring board 70, a set of holes 92 are provided to receive prongs 86 from an input jack 82, as seen in FIG. 3C. The holes 74 are sized to receive screws or other suitable apparatus or the like for engaging the bottom 54 and the wiring board 70 with the top 52. Other ways of affixing the bottom 54 and wiring board 70 to the top 52 may be substituted, such as adhesives, press fit or interlock fits.

As seen in FIG. 3B, the prongs 84 of the output jacks 80 fit into the peripheral holes 72 such that the output jacks 80 are held in front of the wiring board 70 in an outwardly facing position. Similarly, the prongs 86 of the input jack 82 fit into the holes 92 so that the input jack 82 is held in front of wiring board 70, but in a downwardly facing position, as seen in FIG. 3C.

The input jack 82 shown in FIG. 3C is arranged for connection to a jack in a wall-mounted outlet, such as jack 16 of FIG. 1, via a telephone cord 88 having plugs 90a, 90b connected to both ends of the cord 88. The telephone cord 88 is preferably short, such as approximately 2 inches long, and the plugs 90a, 90b may include either RJ11 or RJ45 connectors. The plugs 90a, 90b have release levers 94 for release of the plugs 90a, 90b from the jacks by depression of the release levers 94. Levers of this sort are conventional in telephone jacks. The first plug 90a is inserted into the inputjack 82. This can be most easily accomplished before input the jack 82 is mounted on the wiring board 70. The telephone cord 88 then extends rearwardly from wiring board 70 through a central window 76, and out of the bottom 54 of the housing through a window 112. As seen in FIG. 3D, input jack 82 is located above the window 76. This permits the windows 76 and 112 to serve as an access way for the telephone cord 88. The second plug 90b is then inserted into the jack in a wall-mounted outlet, such as jack 16 of FIG. 1.

The output jacks 80 and the input jack 82 are mounted onto the wiring board 70 and are wired in a factory environment in any desired wiring pattern. For example, all four of the output jacks 80 can be connected with identical wiring to the wires of the input jack 82 so that they form four identical parallel wire connections. Alternatively, since telephone wires are usually provided with two distinct pair of wires, either pair of which is sufficient to transmit and receive, one pair could be wired to one or more of the output jacks 80 and the other pair wired to the remainder.

As shown in FIGS. 3B and 3D, the wiring board 70 further includes several electrical components that provide surge protection for the multiple outlet telephone jack apparatus 50. The surge protection circuitry is provided for each telephone line in the apparatus 50 to protect it from abnormally high currents that have the potential to damage the sensitive telecommunication circuits on the wiring board 70. In a preferred embodiment, the surge protection circuitry includes a zener diode 122 for allowing the electrical current to flow in only one direction. Further, a switch 120, such as a PolySwitch TR600-150 device, manufactured by Raychem, is provided to automatically reset the apparatus when an electrical surge is detected, and allow normal operations to continue. The PolySwitch device uses nonlinear polymeric PTC (positive temperature coefficient) technology to rapidly switch from a low impedance to high impedance state in response to an overcurrent surge. Thus, the PolySwitch device provides an automatically resetting and cost-effective method of protecting sensitive electronics from telecommunication hazards.

A red light emitting diode (LED) 124 for each telephone line is also mounted on the wiring board 70. The LED 124 lights to indicate that the surge protection feature is properly functioning. The LED 124 is a standard round LED lamp. When the wiring board 70 is secured between the bottom 54 and the top 52, the end of the LED fits into opening 130 on the coverplate 96, as shown in FIG. 4C, so that the LED is visible from the front of the top 52.

Other hardware may be mounted on the wiring board 70 and used in the surge suppression circuitry, including a plurality of diodes 126 and at least one resistor 128. All of the hardware components for the surge suppression circuitry are wired in a factory environment in any desired wiring pattern. The following is a list of tables of the preferred specifications for each component:

| | | | PolySwitch (Switch 120) | | | | |
|---|---|---|---|---|---|---|---|
| $I_H$ (A) | Maximum Operating Voltage (V) | Maximum Interrupt Voltage (V) | Maximum Interrupt Current (I) | Minimum Initial Resistance (ohms) | Maximum Initial Resistance (ohms) | $R_1$ Max (ohms) | Typical Power Dissipation (W) |
| 0.150 | 60 | 600 | 3 | 6.0 | 12.0 | 22.0 | 2.5 |

| | Zener 122 | | |
|---|---|---|---|
| DC Sparkover Voltage | Insulation Resistance | | Capacitance |
| Vs(V) | IR(MΩ) | Applied Voltage | C(pF) |
| 255 ~ 345 | ≧100 | DC 100 V | ≦1 |

Diode 126

| Max. Recurrent Peak Reverse Voltage | Max. RMS Voltage | Max. DC Blocking Voltage | Max. Average Forward | Max. Overload Surge | Max. Forward Voltage | Max. Full Load Reverse Current | Max. DC Reverse Current at 25° C. | Typical Junction Capacitance | Operating & Storage Temperature Range |
| --- | --- | --- | --- | --- | --- | --- | --- | --- | --- |
| 400 V | 280 V | 400 V | 1.0 A | 50 A | 1.1 V | 30 A | 5.0 A | 30 DF | −65 to +175° C. |

LED 124

| Chip | | | Absolute Maximum Ratings | | | | Electro-optical Data (At 20 mA) | | | Viewing Angle |
| --- | --- | --- | --- | --- | --- | --- | --- | --- | --- | --- |
| Emitted Color | Peak Wave Length $\lambda P$(nm) | Lens Appearance | $\Delta\lambda$ (nm) | Pd (mW) | If(mA) | Peak If(mA) | Vf(V) Typ. | Vf(V) Max. | Iv Typ (mcd) | 2½ (deg) |
| Red | 655 | Red Diffused | 40 | 110 | 40 | 200 | 1.7 | 2.0 | 8.0 | 95 |

In the embodiment shown in FIGS. 3B, 3D and 4B, two telephone lines are accessible by the apparatus 50. Thus, two sets of the surge protection circuitry are provided, one set for each telephone line.

The assembled output jacks 80 and input jack 82 on the wiring board 70 are ready for mounting between the bottom 54 and the top 52 with screws 94. The top 52, as seen in FIG. 5A, includes a coverplate portion 96 and side walls 98. Thus, when the top 52 is assembled with the bottom 54, the result is a shape that is generally a rectangular parallelepiped. It is generally desirable, however, that the side walls 98 be maintained as short as possible to minimize the distance between the bottom 54 and the coverplate 96, and therefore minimize the amount that the entire apparatus will protrude into a room once installed.

Internally, top 52 is provided with threaded holes 100 having standoffs to receive the screws 94. The standoffs assure that the appropriate spacing between wiring board 70 and the coverplate 96 is maintained for the proper location of the fronts of the output jacks 80 at the side of the top 52 (not visible in FIG. 4A). The bottom 54 is provided with holes 138 that are aligned with holes 74 in the wiring board 70 and holes 100 in the inside of the top 52, so that the screws 94 hold the bottom 54, wiring board 70, and top 52 together.

The coverplate 96 is further provided with rearwardly extending bosses 108 having central holes 58 positioned for alignment to pass above and below the wiring board 70 and in alignment with the holes 110 in the bottom 54. These holes 58, 110 are spaced so that they will align with the mounting holes in the outlet box into which the assembled apparatus is to be installed.

As can be seen in FIGS. 4C and 5B, coverplate 96 of the top 52 has the four openings 114 aligned with the output jacks 80 mounted on the wiring board 70. Thus, when the screws 94 pass through the bottom 54 and wiring board 70, and engage threaded holes 100, the output jacks 80 are available for access through the openings 114 in the front of the top 52. The holes 58 in the center of bosses 108 are also visible.

As seen in FIG. 5C, the window 112 in the bottom 54 is positioned for alignment to receive telephone cord 88, so that the plug 90b can be engaged with a jack mounted in a wall-mounted outlet. The holes 110 in the bottom 54 cooperate with the bosses 108 on the rear of the coverplate 96. The holes 58, 110 and bosses 108 define a passageway for the screws 60 for engagement with the mounting holes of the outlet box installed in the wall to which the apparatus is to be mounted.

Thus, when the bottom 54, wiring board 70, and top 52 are affixed to one another by engagement of the screws 94 with the holes 138, 74, and 100, a generally unitary structure is provided. This unitary structure can then be sold as a commercial unit to a consumer who has no need for disassembly of the apparatus for installation or normal use.

The user can then provide him/herself with a multiplicity of outlet jacks by removing conventional coverplate 10 from an outlet; aligning the assembled apparatus 50 so that the plug 90b on the telephone cord 88 aligns with and is inserted into the jack 16; and securing the unitary structure to the wall using screws 60.

If, for some reason, the user wishes to dismount the apparatus 50, he or she need merely unscrew the screws 60, slightly move the housing away from the outlet box, and depress the lever 94 on the plug 90b, to completely disengage the apparatus from the outlet box.

FIG. 6A shows an embodiment of a top 140 similar in all respects to the top 52 described previously, except that it has several refinements, which can be made to the apparatus either singly or as combinations. First, side holes 142 can be provided in addition to (or instead of) the holes 58 for use with outlet boxes that have similarly-located holes. Of course, corresponding refinements of the wiring board and bottom to accommodate the side holes would also be needed. For example, the wiring board 70 may be formed with notches 150, shown in FIG. 3D, to allow screws to pass through the housing without passing through the wiring board 70. Second, the side walls 144 of the top 140 can be made slightly deeper, on the order of 2–3 mm deeper, to form a lip 141 so that the entire apparatus can fit over top of the original coverplate 10 (see FIG. 1). Thus, when installing the apparatus 50, the screws 12, 14 holding the coverplate 10 would be removed, but not the coverplate 10 itself. The multiple jack apparatus will fit over the old coverplate, and the telephone cord 88 and plug 90b will be properly positioned to engage the original jack. This adds to the security of the fit and reduces the complexity of the installation process. This also allows any excess slack in the telephone cord to be placed behind the housing, within the lip 141, so that it does not interfere with the secure mount of the outlet box on the old coverplate. Third, the top 140 can be provided with legends 146, 148 identifying the output jacks as being either line 1 or line 2. Of course, the wiring of the plug 90a and input jack 82 needs to be coordinated with this labeling.

Those of ordinary skill in the art will appreciate that other variations of design can be made without departing from the spirit or scope of the invention.

While it is impossible to list all such variations, several examples will be given. For example, the number of output jacks 80 need not be four. Other numbers of output jacks can be provided, along with appropriate changes in the numbers of the openings 114 in the coverplate 96. Of course, the top 52 can have other shapes besides rectangular, but does need to have the holes aligned for receiving screws. Various other ways of affixing replicated output jacks 80 to the input jack 82 can be used other than the specific expedient of the wiring board 70, although it does provide a low profile, which is preferable. Wiring board 70 can be affixed to the coverplate 96 by means other than screws, as will be apparent to those of ordinary skill in the art. Also, the bottom 54 can be affixed to the top 52 other than by the inter-engagement of tabs and notches, as will be apparent to those of ordinary skill in the art. Further, various other types of hardware components may be used to provide surge protection for the telecommunication lines.

As will be apparent, the present invention provides a convenient way to replicate telephone jacks through a multiple apparatus which can be securely mounted to an outlet box and provide a minimum protrusion into a room from the outlet box. This provides the advantage of avoidance of collisions, as well as provides a more secure engagement and reduced lever arm, to be able to withstand collisions. In addition, the non-electrician can readily install the device without resort to wiring or other activities which may require specialized knowledge or especially agile manipulations. Further, the present invention provides automatically resetting surge protection for the telecommunications lines to avoid severe damage from power surges.

What is claimed is:

1. An apparatus for providing multiple telephone jacks at an outlet box that has an installed telephone jack and holes to receive cover plate support screws comprising:

a wiring board having mounted thereon an input telephone jack and a plurality of output telephone jacks and wires from said input telephone jack to said plurality of output telephone jacks so that circuits are formed from said input telephone jack to said output telephone jacks;

a housing for said wiring board, said housing having an outlet box side and another side with said wiring board arranged within said housing so that the number of telecommunications paths available from said outlet box side of said housing to said other side of said housing is multiplied, and said housing having mounting holes arranged to receive mounting screws to pass through said housing for engagement with the holes in the outlet box to form a secure mount of said housing on the outlet box; and a telephone cord having a first telephone plug connected to a first end of said telephone cord a second telephone plug connected to a second end of said telephone cord;

wherein the first telephone plug of said telephone cord engages the input telephone jack on said wiring board;

wherein the second end of said telephone cord extends out of said housing on the outlet box side; and wherein the second telephone plug of said telephone cord is configured for engagement with the installed telephone jack of the outlet box.

2. An apparatus as claimed in claim 1 wherein said telephone cord is of such length to permit said telephone cord to be compressed between said outlet box side of said housing and said outlet box so that said telephone cord does not interfere with the secure mount of said housing on said outlet box.

3. An apparatus as claimed in claim 1 wherein said first and second telephone plugs are RJ11 connectors.

4. An apparatus as claimed in claim 1 wherein said first and second telephone plugs are RJ45 connectors.

5. An apparatus as claimed in claim 1 wherein said wiring board has an opening, and the outlet box side of said housing has an opening that is aligned with the opening in said wiring board, to provide an access path for said telephone cord to extend out of said housing.

6. An apparatus as claimed in claim 1 wherein said input telephone jack and said output telephone jacks are RJ11 connector jacks.

7. An apparatus as claimed in claim 1 wherein said input telephone jack and said output telephone jacks are RJ45 connector jacks.

8. An apparatus as claimed in claim 1 wherein said housing includes a top having a coverplate and sidewalls, and a bottom.

9. An apparatus as claimed in claim 8 wherein said wiring board is secured between said top and said bottom, so that the top, the bottom, and the sidewalls substantially surround all sides of said wiring board.

10. An apparatus as claimed in claim 1 wherein said housing includes a top having a coverplate and sidewalls, and a bottom, and wherein said wiring board is secured between said top and said bottom with fasteners passing through said bottom and said wiring board and lodging in said coverplate, so that said top, said bottom, and said sidewalls substantially surround all sides of said wiring board.

11. An apparatus as claimed in claim 10 wherein said coverplate has an outlet box side and standoffs on its outlet box side positioned to hold said wiring board spaced away said coverplate.

12. An apparatus as claimed in claim 10 wherein said coverplate has an outlet box side and bosses on its outlet box side surrounding said mounting holes to hold said bottom spaced away from said coverplate and away from said wiring board.

13. An apparatus as claimed in claim 1 wherein said housing generally has the shape of a rectangular parallelopiped with a minimal distance from the outlet box side to said other side, to provide the appearance of a conventional outlet box coverplate with minimal protrusion into a room from the outlet box when installed.

14. An apparatus as claimed in claim 1 wherein said plurality of output telephone jacks is four output telephone jacks.

15. An apparatus as claimed in claim 1 wherein said wires from said input telephone jack to said output telephone jacks connect all connected output telephone jacks to the same telecommunications path.

16. An apparatus as claimed in claim 1 wherein said wires from said input telephone jack to said output telephone jacks connect one of the connected output telephone jacks to a different telecommunications path than another output telephone jack.

17. An apparatus as claimed in claim 1 wherein said wiring board further comprises surge protection circuitry for protecting said apparatus from abnormally high currents.

18. An apparatus as claimed in claim 17 wherein said surge protection circuitry includes at least one zener diode for allowing electrical current to flow in only one direction.

19. An apparatus as claimed in claim 17 wherein said surge protection circuitry includes at least one switch for automatically resetting said apparatus when an electrical surge is detected, allowing normal operations to continue.

20. An apparatus as claimed in claim 19 wherein said switch is a PolySwitch.

21. An apparatus as claimed in claim 17 wherein said surge protection circuitry includes at least one light emitting diode for indicating that said surge protection circuitry is properly functioning.

22. An apparatus for providing multiple telephone jacks at an outlet box that has an installed telephone jack and holes to receive cover plate support screws comprising:
    a housing and a wiring board in said housing, said housing having an outlet box side and another side and generally having the shape of a rectangular parallelopiped with a minimal distance from the outlet box side to said other side and providing the appearance of a conventional outlet box coverplate with minimal protrusion into a room from the outlet box when installed;
    said wiring board having mounted thereon
        an input telephone jack and four output telephone jacks with wires from said input telephone jack to said output telephone jacks so that four telecommunications circuits are formed from said input telephone jack to said output telephone jacks; and
    said housing including a top and a bottom;
        said top having a coverplate and sidewalls, said wiring board being secured between said top and said bottom with fasteners passing through said bottom and said wiring board and lodging in said coverplate, and said coverplate having holes arranged to receive mounting screws to pass through the housing for engagement with the holes in the outlet box to form a secure mount of the housing on the outlet box, said coverplate having standoffs and bosses, said standoffs being positioned to hold said wiring board spaced away from said coverplate and said bosses surrounding said holes to hold said bottom spaced away from said coverplate and away from said wiring board;
    wherein a telephone cord, having a first telephone plug connected to a first end of the telephone cord and a second telephone plug connected to a second end of the telephone cord, extends from said outlet box side of said housing to enable connection of said wiring board with the installed jack mounted in the outlet box, such that the first telephone plug engages the input jack on said wiring board and said second telephone plug is configured for engagement with the installed telephone jack of the outlet box, said wiring board having an opening and the outlet box side of said housing having an opening that is aligned with the opening in said wiring board to provide and access path for said telephone cord to extend out of said housing.

23. A method of assembly of a telephone jack multiplier for an outlet box comprising:
    affixing a plurality of output telephone jacks and an input telephone plug to a wiring board;
    connecting wires from the input telephone jack to the plurality of output telephone jacks so that circuits are formed from the input telephone jack to the output telephone jacks;
    installing the wiring board in a housing having an outlet box side and another side to form a plurality of telecommunications paths from the outlet box side of the housing to the other side of the housing including inserting a first telephone plug on a first end of a telephone cord into the input telephone jack and extending another end of the telephone cord out of the outlet box side of the housing through an access path created by an opening in the wiring board and an opening in the outlet box side of the housing; and
    providing mounting screws for the housing to pass through holes in the housing for engagement with the holes in the outlet box to form a secure mount of the housing on the outlet box.

24. A method as claimed in claim 23 wherein installing includes affixing the wiring board to between a bottom of the housing and a top of the housing that has a coverplate and sidewalls so that the top, the bottom and the sidewalls substantially surround all sides of the wiring board.

25. A method as claimed in claim 23 wherein installing includes securing the wiring board between a bottom of the housing and a coverplate of the housing by passing fasteners through the bottom and the wiring board, and lodging the fasteners in the coverplate.

26. A method as claimed in claim 23 wherein connecting the wires from the input telephone jacks to the output telephone jacks includes connecting all connected output telephone jacks to the same telecommunications path.

27. A method as claimed in claim 23 wherein connecting the wires from the input telephone jacks to the output telephone jacks includes connecting one of the connected output telephone jacks to a different telecommunications path than another output telephone jack.

28. A method of assembly of a multiple telephone jack apparatus for an outlet box comprising:
    affixing a plurality of output telephone jacks and an input telephone jack to a wiring board;
    connecting wires from the input telephone jack to the plurality of output telephone jacks so that circuits are formed from the input telephone jack to the output telephone jacks; and
    installing the wiring board in a housing having an outlet box side and another side to form a plurality of telecommunications paths from the outlet box side of the housing to the other side of the housing including:
        affixing the wiring board between a bottom for the housing and a top for the housing that has a coverplate and sidewalls, and securing the wiring board between the bottom and the coverplate by passing fasteners through the bottom and the wiring board, and lodging the fasteners in the coverplate so that the top, the bottom, and the sidewalls substantially surround all sides of the wiring board;
        inserting a first telephone plug on a first end of a telephone cord into the input telephone jack; and
        extending another end of the telephone cord out of the outlet box side of the housing through an access path created by opening in the wiring board and an opening in the outlet box side of the housing; and providing mounting screws for the housing to pass through holes in the housing for engagement with the holes in the outlet box to form a secure mount of the housing on the outlet box.

29. A method of installation of a multiple telephone jack apparatus on an outlet box in a surface comprising:

removing a coverplate from the outlet box to expose an opening in the surface and an installed jack and mounting holes on the outlet box, positioning a multiple telephone jack apparatus on the opening in the surface while inserting a telephone plug that extends from the apparatus on a telephone cord into the installed jack; and passing screws through the multiple telephone jack apparatus and into the mounting holes on the outlet box to secure the multiple telephone jack apparatus onto the outlet box.

30. A method of removal of a multiple telephone jack apparatus from an outlet box in a surface comprising:

unscrewing screws that pass through the multiple telephone jack apparatus and into the mounting holes on the outlet box to loosen the multiple telephone jack apparatus from the outlet box;

slightly moving the multiple telephone jack apparatus away from the outlet box;

deflecting a release lever on a telephone plug extending from the multiple telephone jack apparatus on a telephone cord to release the telephone plug from the jack in the outlet box, and moving the multiple telephone jack apparatus away from the outlet box.

31. A method of installation of a multiple telephone jack apparatus on an outlet box in a surface comprising:

removing screws holding a coverplate to the outlet box that has a single installed jack to expose screw mounting holes in the coverplate on the outlet box, positioning a multiple telephone jack apparatus on the coverplate while inserting a telephone plug that extends from the multiple telephone jack apparatus on a telephone cord into the installed jack; and passing long screws through the multiple telephone jack apparatus and into the mounting holes on the outlet box to secure the multiple telephone jack apparatus onto the outlet box.

32. An apparatus for providing multiple telephone jacks at an outlet box that has an installed telephone jack and holes to receive cover plate support screws comprising:

a wiring board having mounted thereon a telephone plug and a plurality of telephone jacks and wires from the plug to the plurality of telephone jacks so that circuits are formed from the plug to the telephone jacks to enable connections to be made to telecommunications equipment;

a housing for the wiring board, the housing having an outlet box side and another side with the wiring board arranged within the housing so that the number of telecommunications paths available from the outlet box side of the housing to the other side of the housing is multiplied, and the housing having holes arranged to receive mounting screws to pass through the housing for engagement with the holes in the outlet box to form a secure mount of the housing on the outlet box;

and surge protection circuitry in the housing for protecting connected telecommunications equipment from abnormally high currents.

\* \* \* \* \*